United States Patent [19]

Windle

[11] 4,061,502

[45] Dec. 6, 1977

[54] BALL CLAY

[75] Inventor: William Windle, London, England

[73] Assignee: English Clays Lovering Pochin & Company Limited, England

[21] Appl. No.: 635,334

[22] Filed: Nov. 26, 1975

[30] Foreign Application Priority Data

Nov. 29, 1974   United Kingdom ............... 51892/74

[51] Int. Cl.² ............................................ C04B 33/13
[52] U.S. Cl. ........................................ 106/72; 106/73
[58] Field of Search .................................. 106/72, 73

[56] References Cited

U.S. PATENT DOCUMENTS

| | | | |
|---|---|---|---|
| 2,815,292 | 12/1957 | Thiele .................................. | 106/72 |
| 3,257,218 | 6/1966 | Primak .................................. | 106/73 |
| 3,266,917 | 8/1966 | Sawyer et al. ........................ | 106/73 |
| 3,366,445 | 1/1968 | Einstein et al. ....................... | 106/72 |
| 3,725,100 | 4/1973 | Zertz et al. ............................ | 106/72 |

OTHER PUBLICATIONS

"A Dictionary of Mining, Mineral, and Related Terms," compiled & edited by P. W. Thresch & Staff of the Bureau of Mines, U.S. Department of the Interior, 1968, p. 75.

*Primary Examiner*—Winston A. Douglas
*Assistant Examiner*—Mark Bell
*Attorney, Agent, or Firm*—Armstrong, Nikaido & Marmelstein

[57] ABSTRACT

A method of improving the properties of ball clay is disclosed which comprises forming a deflocculated aqueous suspension of the ball clay at a specified solids content; passing the suspension through one or more vibrated sieves, at least one of which has a nominal aperture in the range of from 50 to 100 microns; and thermally drying the material after it has been flocculated.

12 Claims, No Drawings ns. Ball

BALL CLAY

BACKGROUND OF THE INVENTION

This invention relates to the processing of ball clays.

Ball clay is a sedimentary, kaolinitic clay which has a high elasticity and a particle size distribution such that a substantial proportion of the particles have an equivalent spherical diameter smaller than one micron. Ball clay occurs in the United Kingdom in three relatively small and discrete deposits in North Devon, South Devon and Dorset respectively, and also in the U.S.A., France, Germany, Italy, Spain and other countries. It generally occurs in nature associated with certain impurities, principally with quartz, lignite, mica, feldspar, iron oxides and sulphides. Although the impurities especially the lignite and iron-containing compounds give the clay a colour in its raw state which varies from pale cream to black, when the clay is calcined a good white colour is obtained provided that the iron and titania content is below a certain specified level (the two generally must not exceed 2.2% by weight in toto of the ball clay), since lignite is completely ignited at the high temperatures which prevail in the kilns. The properties of ball clay render it a very desirable ingredient of ceramic bodies and it is also used as a filler for natural and synthetic rubbers.

Conventionally, ball clay is produced by digging the raw clay from the ground in the form of blocks of plastic material which contain about 20% by weight of water. This material may be sold as it is or in a shredded form. Alternatively, the shredded clay may be thermally dried to give a product in lump or pellet form. If desired the thermally dried product may be further dried and disintegrated to powder in, for example, a heated impact mill. Generally speaking no attempts have been made to improve the properties of ball clays, since firstly there have hitherto been ample supplies of good quality ball clay deposits, and secondly it is difficult to process ball clays. Dry refining does not, generally speaking, have a significant effect in improving the properties of ball clays, and wet processing has been ignored because of problems associated with the fine particle size of ball clays.

As reserves of clay having the most desirable properties for the ceramic and other industries are being used up, it is becoming increasingly difficult to meet the demand for clay having these properties. On the other hand, there are large reserves of clay which do not have such desirable properties and for which it is at present difficult to find a market outlet. It is therefore becoming necessary to use these poorer grade ball clays and to develop processes for their improvement.

Our pending British Patent Application No. 47635/73 describes a process of improving the properties of a ball clay comprising the steps of:

a. suspending the raw ball clay in water to form a suspension the solids content of which is not greater than 55% by weight;

b. subjecting the aqueous suspension of raw ball clay thus obtained to a beneficiation operation in order to remove undesirable impurities from the ball clay;

c. thickening the aqueous suspension of beneficiated ball clay in an apparatus, for example a centrifuge, which is equipped with means for discharging a thickened, solid-containing material to produce a dewatered, beneficiated ball clay the solids content of which is at least 50% by weight; and d. drying the dewatered, beneficiated ball clay.

Prior to the invention described and claimed in British Patent Application No. 47635/73, ball clay had not been processed in the wet state. The proportion of very fine particles (equivalent spherical diameter less than one micron) in ball clay makes filtration of an aqueous suspension of the clay by conventional means exceedingly slow or impossible. This difficulty was obviated in the earlier invention described above by use of a centrifuge. Although this process gives very satisfactory results the thickening step (c) has been found to be expensive. It is an object of the present invention to provide a process for improving the properties of relatively low-grade ball clays, which process does not include an expensive dewatering step.

SUMMARY OF THE INVENTION

Despite the well-known difficulties of filtering ball clays, it has now surprisingly been found that satisfactory results can be achieved under certain conditions by use of a vibrating sieve. More particularly, according to the present invention, there is provided a method of improving the properties of a ball clay, which method comprises the steps of:

a. suspending the raw ball clay in water containing a dispersing agent to form a deflocculated suspension the solids content of which is in the range of from 55% to 75% by weight;

b. passing the deflocculated aqueous suspension of raw ball clay through one or more vibrated sieves, at least one of which has a nominal aperture in the range of from 50 to 100 microns; and c. flocculating the sieved material and subjecting the flocculated material to thermal drying.

We have found that the sieving operation removes some of the undesirable impurities, such as free silica and carbonaceous matter, thereby improving the properties of the ball clay.

DESCRIPTION OF THE PREFERRED EMBODIMENTS

In step (a) the dispersing agent used to deflocculate the ball clay may comprise a water-soluble salt of a polysilicic acid, a water-soluble condensed phosphate, a water-soluble salt of a polyacrylic or polymethacrylic acid or a copolymeric deflocculant of the type described and claimed in our British Patent Specification No. 1,414,964. The quantity of dispersing agent used will generally be in the range from 0.1% to 2.0% by weight based on the weight of the dry ball clay. It may also be desirable to add an alkali, e.g. a carbonate or hydroxide of sodium, potassium or ammonium, to adjust the pH to the valve at which the aqueous suspension has the minimum viscosity. The pH will generally be in the range from 7.0 to 9.0.

In step (b) the sieves may be vibrated either mechanically or electrically and in an oscillating, reciprocating or gyratory manner. Suitable vibrating sieves are described in "Chemical Engineers' Handbook", 5th Edition, by Robert H. Perry and Cecil H. Chilton, McGraw-Hill Book Company, New York, 1973, pages 21-41 to 21-42. Preferably at least one of the sieves has a nominal aperture in the range of from 50 to 75 microns.

The sieved deflocculated aqueous suspension of ball clay may be subjected, if desired, to further processing steps before being flocculated and thermally dried. The ball clay is conveniently flocculated by adding sufficient of a dilute mineral acid to reduce the pH to a value within the range from 2.5 to 4.5 but, alternatively, other flocculants may be used such as those based on polyacrylamide or polyacrylic acid. The flocculated ball clay may be extruded or pelletised, after mixing with dry clay if necessary, and dried in a suitable thermal drier such as a rotary drier, a turbo-tray drier, an apron drier or a fluidised bed drier to a water content which is advantageously about 15% by weight or less.

If the aqueous suspension has a solids content of less than 55% by weight, it is necessary to evaporate thermally an excessive amount of water, which results in an expensive process. If the solids content of the suspension exceeds 75% by weight, its fluidity is decreased so that the sieving step becomes unacceptably slow. The best results have been obtained with an aqueous suspension containing from 60 to 70% by weight of solids, and preferably about 65% by weight of solids.

EXAMPLE 1

A sample of highly siliceous raw ball clay from the North Devon deposit was mixed with water containing (a) 3.2 g. per kilogram of dry clay of a sodium polyacrylate dispersing agent having a number average molecular weight of 1650 and (b) 1.0 g. of sodium carbonate per kilogram of dry clay to raise the pH to 8.5. The quantity of water was such that the solids content of the suspension when completely mixed was 70% by weight and the viscosity as measured with a Brookfield Viscometer using Spindle No. 2 at a speed of 100 r.p.m. was 233 centipoise.

The suspension was divided into three portions, one portion being diluted with water until the solids content was 65% by weight, the second portion being diluted until the solids content was 60% by weight and the third portion remaining at 70% by weight. Each portion was passed through a twin deck vibratory sieve, the top deck being a No. 100 mesh British Standard sieve (nominal aperture 150 microns) and the lower deck being a No. 200 mesh British Standard sieve (nominal aperture 75 microns). The rates at which the material passed through the No. 200 mesh sieve were noted and the results are shown in Table 1 below:

TABLE 1

| % by weight of solids | g. of solids per cm² of sieve area per minute |
|---|---|
| 70 | 1.21 |
| 65 | 1.38 |
| 60 | 2.21 |

The material passing through the No. 200 mesh sieve was flocculated in each case by adding dilute sulphuric acid to the suspension until the pH was reduced to 3.8. In the case of the suspensions having solid contents of 70% and 65% respectively the flocculated material was sufficiently firm and plastic to be handled by an extruder whereby it could be fed to a suitable dryer. The flocculated material having a solids content of 60%, however, was too thin to be handled successfully in an extruder. The suspension which gave the best combination of flow rate through the sieves in a deflocculated state and handleability in a flocculated state was that having a solids content of 65% by weight.

The material having a solids content of 65% by weight was extruded and thermally dried. The dried material thus obtained was analysed for silica, alumina and carbon and was tested for fired brightness, absorption and modulus of rupture at 80% relative humidity.

The fired brightness was measured by forming a compacted disc of the dried clay and firing the disc to a maximum temperature of 1210° C. and measuring the reflectance of light of wave-length 504 nm from the surface of the fired disc (magnesium oxide = 100%).

The absorption was measured by placing the fired disc in an evacuated desiccator and slowly covering the disc with distilled water which had been boiled and cooled. The desiccator was again evacuated until no further air could be drawn out of the disc. The disc was then removed from the water and the quantity of absorbed water determined by weighing.

The modulus of rupture was measured by preparing rod-shaped specimens of the dried, treated but unfired ball clay and conditioning them for 16 hours at 80% relative humidity. A rod was then supported on two knife edges and a steadily increasing load was applied to the centre of the rod, midway between the two knife edges, until the rod broke. The modulus of rupture was calculated from the expression:

$$modulus = 8PL/\pi D^3$$

where
$P$ is the distance between the supporting knife edges in centimeters;
$L$ is the load applied to break the specimen in kilograms; and
$D$ is the diameter of the specimen in centimeters.

Samples of untreated ball clay identical to that which had been treated were similarly tested. The results are shown in Table II below:

TABLE II

| | Original ball clay | Treated ball clay |
|---|---|---|
| % by wt. of SiO$_2$ (free and combined) | 83 | 76 |
| % by wt. of Al$_2$O$_3$ | 10 | 14 |
| % by wt. of Carbon | 0.05 | 0.13 |
| Fired brightness (1210° C) | 48.8 | 50.7 |
| Absorption (% by wt.) | 4.0 | 5.0 |
| Modulus of rupture at 80% RH (kgf/cm²) | 21.0 | 27.7 |

It can be seen that treatment in accordance with the invention has reduced the free silica content of the ball clay as a result of which the proportion of alumina (though not the alumina content) has increased. This is a desirable result. Also, the proportion of carbonaceous matter has increased, but this is not deleterious as can be seen from the improved fired brightness obtained with the treated ball clay. Finally, the strength of rods of treated ball clay was considerably greater than that of rods formed from untreated ball clay.

EXAMPLE 2

A sample of highly carbonaceous raw ball clay from the South Devon deposit was mixed with water containing 3.3 g. (per kilogram of dry clay) of the same sodium polyacrylate dispersing agent as was used in Example 1 and 0.6 g. of sodium carbonate per kilogram of dry clay to raise the pH to 8.5. The quantity of water was such that the solids content of the suspension when completely mixed was 70% by weight and the viscosity as measured with a Brookfield Viscometer using Spindle No. 2 at a speed of 100 r.p.m. was 352 centipoise.

The suspension was divided into three portions and water was added where necessary to give solids contents of 70%, 65% and 60% by weight, respectively. Each portion was passed through a twin deck vibratory sieve, the top deck being a No. 50 mesh British Standard sieve (nominal aperture 300 microns) and the lower deck being a No. 200 mesh British Standard sieve. The rates at which the material passed through the No. 200 mesh sieve were noted and the results are shown in Table III below:

TABLE III

| % by weight of solids | g. of solids per cm$^2$ of sieve area per minute |
|---|---|
| 70 | 0.450 |
| 65 | 0.880 |
| 60 | 0.916 |

The material passing through the No. 200 mesh sieve was flocculated in each case by adding dilute sulphuric acid to the suspension until the pH was reduced to 3.8. All three suspensions when flocculated were sufficiently firm and plastic to be handled in an extruder and thereby fed to a thermal drier. The solids content of 65% was chosen as being the most suitable since a suspension of this consistency showed a good flow rate through the sieve when deflocculated and the quantity of water to be removed by thermal evaporation was relatively low.

The material having a solids content of 65% by weight was extruded and thermally dried. The dry material thus obtained was analysed for silica, alumina, ferric oxide, titania and carbon and was tested for fired brightness, absorption and modulus of rupture of 80% relative humidity, the procedures being as described in Example 1.

The results are shown in Table IV below:

TABLE IV

| | Original Ball Clay | Treated Ball Clay |
|---|---|---|
| % by wt. of SiO$_2$ | 42 | 43 |
| % by wt. of Al$_2$O$_3$ | 30 | 31 |
| % by wt. of Fe$_2$O$_3$ | 1.14 | 1.14 |
| % by wt. of TiO$_2$ | 0.65 | 0.68 |
| % by wt. of carbon | 9.6 | 5.8 |
| Fired brightness (1210° C) | 78.6 | 80.6 |
| Absorption (% by wt.) | 8.0 | 10.0 |
| Modulus of rupture at 80% RH (Kgf/cm$^2$) | 18.2 | 18.6 |

The original ball clay did not fire very well, since bubbles of carbon dioxide were formed from the carbonaceous matter present. This is a serious problem in the fabrication of ceramics since it causes structural damage to the fired article and loss of dimensional accuracy. Bubbling was not a problem when the treated ball clay was fired.

EXAMPLE 3

The same highly siliceous raw ball clay as was used in Example 1 was mixed with water containing 3.25 g. per kilogram of dry clay of the same sodium polyacrylate dispersing agent and 1.2 g. of sodium carbonate per kilogram of dry clay to raise the pH to 8.5. The quantity of water was such that the solids content of the suspension when completely mixed was 70% by weight and the viscosity as measured with a Brookfield Viscometer using Spindle No. 2 at a speed of 100 rpm was 225 centipoise.

The suspension was divided into three portions, one portion being diluted with water until the solids content was 65% by weight, the second portion being diluted until the solids content was 60% by weight and the third portion remaining at 70% by weight. Each portion was passed through a twin deck vibratory sieve, the top deck being a No. 100 mesh British Standard sieve and the lower deck being a No. 300 mesh British Standard sieve (nominal aperture 53 microns). The rates at which the material passed through the No. 300 mesh sieve were noted and the results are shown in Table V below:

TABLE V

| % by weight of solids | g. of solids per cm$^2$ of sieve area per minute |
|---|---|
| 70 | 0.52 |
| 65 | 0.98 |
| 60 | 1.54 |

The material passing through the No. 300 mesh sieve was flocculated in each case by adding dilute sulphuric acid to the suspension until the pH was reduced to 3.8. In the case of the suspensions having solids contents of 70% and 65%, respectively, the flocculated material was sufficiently firm and plastic to be handled by an extruder whereby it could be fed to a suitable thermal dryer. The flocculated material having a solids content of 60%, however, was too thin to be handled successfully in an extruder. The suspension which gave the best combination of flow rate through the sieves in a deflocculated state and handleability in a flocculated state was that having a solids content of 65% by weight.

The material having a solids content of 65% by weight was extruded and thermally dried. The dry material thus obtained was analysed for silica, alumina, ferric oxide, titania and carbon and was tested for fired brightness, absorption and modulus of rupture at 80% relative humidity, the testing procedures being as described in Example 1.

The results are shown in Table VI below:

TABLE VI

| | Original Ball Clay | Treated Ball Clay |
|---|---|---|
| % by wt. of SiO$_2$ | 83 | 74 |
| % by wt. of Al$_2$O$_3$ | 10 | 16 |
| % by wt. of Fe$_2$O$_3$ | 0.4 | 0.6 |
| % by wt. of TiO$_2$ | 1.6 | 1.7 |
| % by wt. of carbon | 0.05 | 0.17 |
| Fired brightness (1210° C) | 48.8 | 51.3 |
| Absorption (% by wt.) | 4.0 | 4.2 |
| Modulus of rupture at 80% RH (Kgf/cm$^2$) | 21.0 | 28.5 |

EXAMPLE 4

The same highly carbonaceous raw ball clay as was used in Example 2 was mixed with water containing sodium polyacrylate dispersing agent and sodium carbonate in the same quantities relative to the weight of clay as in Example 2. The quantity of water was such that the solids content of the suspension when completely mixed was 60% by weight.

The suspension was passed through a twin deck vibratory sieve, the top deck being a No. 50 mesh British Standard sieve (nominal aperture 305 microns) and the lower deck being a No. 300 mesh British Standard sieve. The rate at which the material passed through the No. 300 mesh sieve was 0.62 g. of solids per cm$^2$ of sieve area per minute.

The material passing through the No. 300 mesh sieve was flocculated by adding dilute sulphuric acid to the suspension until the pH was reduced to 3.8. The flocculated material was extruded and thermally dried. The dry material thus obtained was analysed for silica, alumina, ferric oxide, titania and carbon and was tested for fired brightness, absorption and modulus of rupture at 80% relative humidity, the testing procedures being as described in Example 1.

The results are shown in Table VII below:

TABLE VII

|  | Original Ball Clay | Treated Ball Clay |
|---|---|---|
| % by wt. of $SiO_2$ | 42 | 43 |
| % by wt. of $Al_2O_3$ | 30 | 30 |
| % by wt. of $Fe_2O_3$ | 1.14 | 1.2 |
| % by wt. of $TiO_2$ | 0.65 | 0.59 |
| % by wt. of carbon | 9.6 | 5.4 |
| Fired brightness (1210° C) | 78.6 | 85.1 |
| Absorption (% by wt.) | 8.0 | 15.3 |
| Modulus of rupture at 80% RH ($Kgf/cm^2$) | 18.2 | 21.6 |

As in the case of Example 2, the treated ball clay was superior to the original ball clay when subjected to firing.

What is claimed is:

1. A method of improving the properties of a ball clay, which method comprises the steps of:
   a. suspending the raw ball clay in water containing a dispersing agent to form a deflocculated suspension the solids content of which is in the range of from 55% to 75% by weight;
   b. passing the deflocculated aqueous suspension of raw ball clay through one or more vibrated sieves, at least one of which has a nominal aperture in the range of from 50 to 100 microns; and
   c. flocculating the sieved material and subjecting the flocculated material to thermal drying.

2. A method according to claim 1, wherein the deflocculated aqueous suspension of ball clay is passed through two vibrated sieves the first sieve having a coarser mesh than the second sieve.

3. A method according to claim 2, wherein the first of the two sieves has a nominal aperture of not more than about 300 microns and the second of the two sieves has a nominal aperture of not more than about 75 microns.

4. A method according to claim 3, wherein the solids content of the deflocculated aqueous suspension is in the range of from 60% to 70% by weight.

5. A method according to claim 4, wherein the solids content of the deflocculated aqueous suspension is about 65% by weight.

6. A method according to claim 2, wherein the dispersing agent is selected from the group consisting of water-soluble salts of polysilicic acids, water-soluble condensed phosphates, and water-soluble salts of polyacrylic and polymethacrylic acids.

7. A method according to claim 6, wherein there is used from 0.1% to 2.0% by weight of dispersing agent based on the weight of dry ball clay.

8. A method according to claim 1, wherein an alkali is added to the aqueous suspension of ball clay before the end of step (a) to adjust the pH of the suspension substantially to the value at which the suspension has minimum viscosity.

9. A method according to claim 1, wherein the sieved material is flocculated by treatment with a dilute mineral acid to reduce the pH to a value of from 2.5 to 4.5.

10. A method according to claim 1, wherein the flocculated material is extruded or pelletised before being subjected to thermal drying.

11. A method of improving the properties of a ball clay, which method comprises the steps of:
   a. suspending the raw ball clay in water containing a dispersing agent to form a deflocculated suspension the solids content of which is in the range of from 60% to 70% by weight and adding an alkali to the suspension so as to adjust the pH of the suspension substantially to the value at which the suspension has minimum viscosity;
   b. passing the deflocculated aqueous suspension of raw ball clay through two vibrated sieves, the first of the two sieves having a relatively coarse mesh with a nominal aperture of not more than about 300 microns and the second of the two sieves having a relatively fine mesh with a nominal aperture of not more than about 75 microns;
   c. flocculating the sieved material by treatment with a dilute mineral acid so as to reduce the pH of the sieved material to a value of from about 2.5 to about 4.5; and
   d. subjecting the flocculated material to extrusion or pelletisation and thermally drying the extruded or pelletised material.

12. A method according to claim 11, wherein the dispersing agent is selected from the group consisting of water-soluble salts of polysilicic acids, water-soluble condensed phosphates, and water-soluble salts of polyacrylic and polymethacrylic acids.

* * * * *